United States Patent [19]

Gschwind

[11] Patent Number: 4,614,372
[45] Date of Patent: Sep. 30, 1986

[54] DEVICE FOR JOINING A PIPE AND A CONNECTION PIECE

[75] Inventor: Peter Gschwind, Stüsslingen, Switzerland

[73] Assignee: Vestol SA., Vevey, Switzerland

[21] Appl. No.: 722,611

[22] Filed: Apr. 12, 1985

[51] Int. Cl.$^4$ ............................................. F16L 47/00
[52] U.S. Cl. ................................. 285/356; 285/250; 285/353; 285/393
[58] Field of Search ............... 285/250, 356, 393, 357, 285/353

[56] References Cited

U.S. PATENT DOCUMENTS

| | | | |
|---|---|---|---|
| 688,514 | 12/1901 | Hanna | 285/250 |
| 2,120,275 | 6/1938 | Cowles | 285/250 X |
| 2,694,584 | 11/1954 | Miller | 285/250 |
| 3,025,086 | 3/1962 | Mosely | 285/250 |
| 3,352,577 | 11/1967 | Medney | 285/246 |

FOREIGN PATENT DOCUMENTS

| | | | |
|---|---|---|---|
| 143066 | 10/1935 | Austria | 285/250 |
| 1163620 | 2/1964 | Fed. Rep. of Germany . | |
| 875742 | 8/1961 | United Kingdom . | |

OTHER PUBLICATIONS

Draft, 06-1980, of DIN 8076: Druckrohrleitungen aus Polyethylen (PE)—Klemmverbinder aus Metall; Deutsches Institut fur Normung e.V., Berlin.

Primary Examiner—Richard J. Scanlan, Jr.
Attorney, Agent, or Firm—Birch, Stewart, Kolasch & Birch

[57] ABSTRACT

The device comprises a clamping jaw and a two-piece union nut. The clamping jaw is U-shaped in longitudinal section and straddles the end of the pipe so that it surrounds this pipe end from inside and from outside simultaneously. The two-piece union nut is composed of a first part and a second part which is inserted between the first part and the outer leg of the clamping jaw. The second part is provided with a left-hand external thread which meshes with a left-hand internal thread of the first part. Every location to be made tight within the device is sealed twice when the union nut is tightened, so that the connection is completely fluid-tight.

5 Claims, 1 Drawing Figure

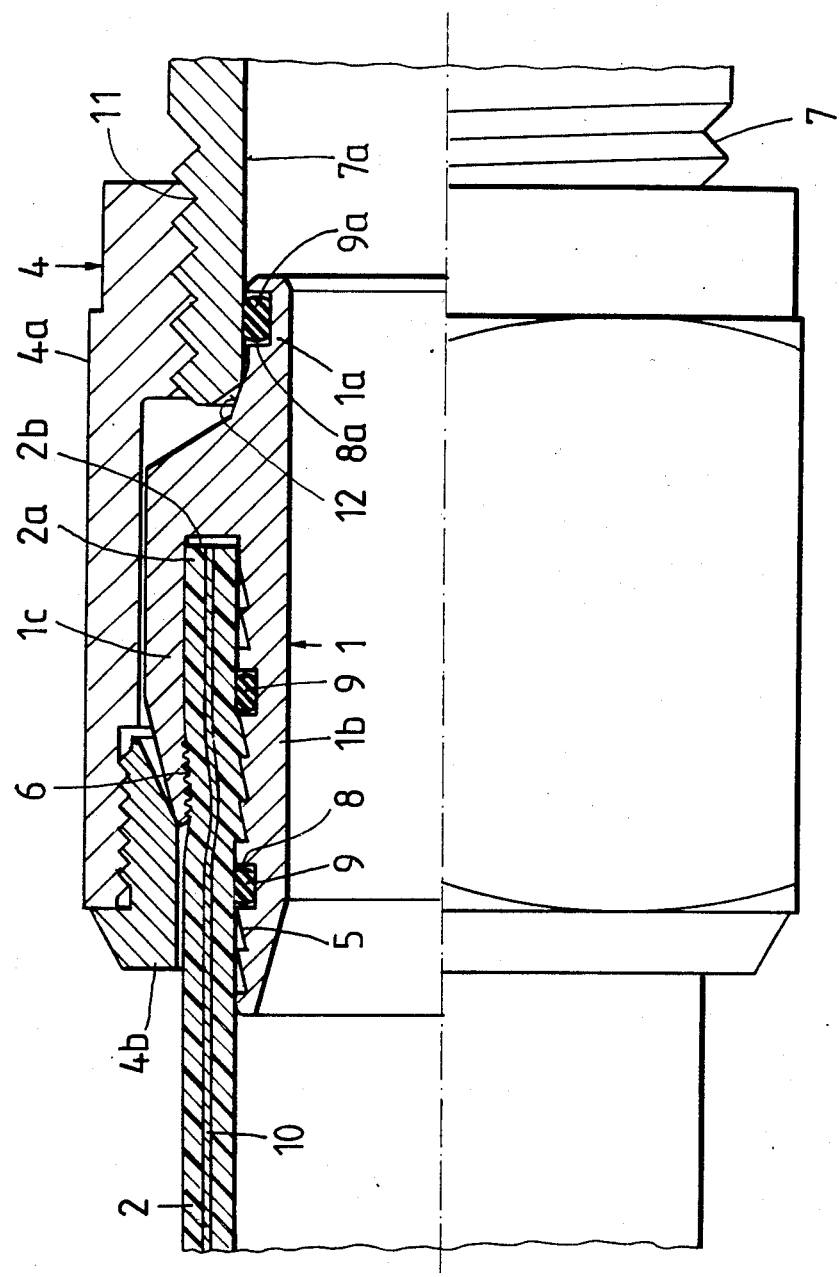

DEVICE FOR JOINING A PIPE AND A CONNECTION PIECE

BACKGROUND OF THE INVENTION

1. Field of the Invention

This invention relates to piping, and more particularly to a device for joining a pipe to a threaded connection piece, of the type having a union nut slipped over the pipe, i.e., the end of the pipe, and a clamping jaw set on the end of the pipe, which jaw has in longitudinal section substantially the shape of a U with a tail portion, the legs of which U straddle the end of the pipe and are provided on their surfaces facing the pipe with one toothing each, recesses with inserted O-rings being provided in the surface of its tail portion facing the threaded connection piece from within, as well as in the surface of the inner leg facing the end of the pipe from within, and the union nut clamps the clamping jaw to the pipe upon tightening.

2. Description of Background Art

The connection of a pipe to a threaded connection piece has heretofore usually been established by means of two cones and a union nut. One of the cones, having a connection part for the pipe running out of it, is inserted into the threaded connection piece. A diagonally slotted clamping ring is put on the pipe which has been set on the connection piece. By tightening the union nut, the slotted clamping ring is squeezed and pressed against the pipe. The diagonal slot of the clamping ring is intended to prevent the pipe material from being pinched in the clamping ring.

According to the draft of German standard No. 8076, there is furthermore known a metal clamp connector intended for connecting polyethylene pipes to one another or to fittings, etc. The clamp connector consists of a union nut slipped over the pipe and a support sleeve inserted in the pipe. In addition, the clamp connector also includes a clamping ring.

SUMMARY AND OBJECTS OF THE INVENTION

It is an object of this invention to provide an improved device for joining a pipe and a threaded connection piece which consists of simple means and already ensures complete fluid-tightness of the connection when tightened by hand, for example.

A further object of the invention is to provide such a device which allows the pipe diameter to be chosen independently of the thread size of the connection piece.

To this end, in the device according to the present invention, of the type initially mentioned, the union nut is a nut which has a first part and a second part and which clamps on the pipe via the second part, each location to be made tight within the device when the union nut is tightened and is sealed twice.

The outside diameter of the pipe may advantageously be larger than the right-hand thread inside diameter of the first part of the two-piece nut.

BRIEF DESCRIPTION OF THE DRAWING

A preferred embodiment of the invention will be described in detail with reference to the accompanying drawing, the sole FIGURE of which is a longitudinal section through the invented device having a two-piece union nut.

DETAILED DESCRIPTION OF THE PREFERRED EMBODIMENT

The device for joining a pipe 2 and a threaded connection piece 7 comprises a clamping jaw 1 and a two-piece union nut 4. Pipe 2 may be of metal or plastic, or it may be a laminated (composite) pipe. The individual parts of the device are of metal. This also applies to threaded connection piece 7.

Clamping jaw 1 in longitudinal section has substantially the shape of a U including a tail portion 1a. The two legs 1b, 1c of the U are of unequal length. Clamping jaw 1 straddles the end of 2a and pipe 2 so that it encloses pipe end 2a from inside and outside, the longer leg 1b of the U being situated inside pipe end 2a.

The longer U-leg, 1b, is provided on its surface facing pipe and 2a with a coarse toothing 5 and two recesses 8 containing elastic O-rings 9. The shorter U-leg 1c rests against the outside of pipe end 2a. On its surface facing pipe 2, it includes a fine toothing 6.

The clamping jaw 1 straddling pipe end 2a of the composite pipe 2 shown in the drawing also encloses the cut surface of pipe 2, so that an aluminum pipe component 10 is protected from the medium flowing through pipe 2 and thus from moisture and corrosion. A recess 8a holding an elastic O-ring 9a is likewise provided in the surface of tail portion 1a of clamping jaw 1 facing threaded connection piece 7 from inside.

As may be seen in the drawing, the two-piece union nut 4 slipped over pipe end 2a consists of a first part 4a and a second part 4b. First part 4a has at one end a right-hand internal thread 11 engaging the external thread of threaded connection piece 7. The other end of first part 4a is provided with a left-hand internal thread engaging a left-hand external thread of second part 4b, which is situated between first part 4a and the outer leg 1c of clamping jaw 1 as an insert piece.

In the drawing, pipe and 2a is shown clamped. When first part 4a of the two-piece union nut 4 is tightened against threaded connection piece 7, insert piece 4b is pulled along and pressed against the outer leg 1c of the U. Here pipe end 2a is clamped between outer leg 1c and inner leg 1b of clamping jaw 1. Teeth 5 and 6 keep pipe 2 from being pulled out.

When union nut 4 is tightened, each location to be made tight within the device is sealed twice. The location to be made tight between inner leg 1b of clamping jaw 1 and pipe end 2a is sealed once by means of O-rings 9 and again by means of the clamped teeth 5. Moreover, the location to be made tight between the outer leg 1c of clamping jaw 1, on the one hand, and pipe end 2a and union nut 4, on the other hand, is additionally sealed by means of the clamped teeth 6. Finally, the location to be made tight between tail portion 1a of clamping jaw 1 and the inside wall 7a of threaded connection piece 7 is sealed once by means of O-ring 9a and again by means of inner wall 7a resting against an inclined surface 12 of tail portion 1a.

Fluid-tightness is already ensured after union nut 4 has been slightly tightented. This means that at a construction site, for example, if the union nut is insufficiently or not completely tightened, the device will nevertheless be totally fluid-tight. The metallic sealing is achieved by tightening with a tool (fork wrench, not shown).

The device described above makes it possible to choose the pipe diameter independently of the thread size of the threaded connection piece; i.e., with a tee having three identical thread sizes, for instance, pipes of any size can be connected by using different clamping jaws and union nuts. An equal tee thus becomes a reducing tee.

The use of a two-piece union nut makes it possible to select an outside pipe diameter which is larger than the diameter of internal thread 11 of first part 4a, fitting whatever threaded connection piece 7 may be desired. By screwing insert piece 4b together with the internal thread of first part 4a of two-piece union nut 4, the self-loosening effect is prevented during subsequent assembly of the union nut and clamping jaw on any desired threaded connection pipe, i.e., the moment of tension is increased by a countereffect.

The following connection sizes are possible with pipe having a wall thickness of 1–6 mm, for instance:

| E.g., Gas Pipe Thread | Inside Diameter of Pipe |
| --- | --- |
| $\frac{3}{8}'' \times$ | 8–18 mm |
| $\frac{1}{2}'' \times$ | 10–22 mm |
| $\frac{3}{4}'' \times$ | 12–30 mm |
| $1'' \times$ | 12–35 mm |
| $1\frac{1}{4}'' \times$ | 18–45 mm |
| $1\frac{1}{2}'' \times$ | 20–50 mm |
| $2'' \times$ | 25–65 mm. |

What is claimed is:

1. A device for joining a pipe to a threaded connection piece, of the type having a substantially U-shaped clamping jaw including a tail portion and first and second legs intended to straddle an end of said pipe, the surface of said tail portion intended to face the inner wall of said threaded connection piece and the surface of said first leg intended to face the inner wall of said pipe including one or more recesses, one or more O-rings respectively inserted in said recesses, and the surface of each of said first and second legs intended to face said pipe including a plurality of teeth, and a union nut to be slipped over said end of said pipe for clamping said clamping jaw to said pipe upon tightening of said union nut, wherein the improvement comprises said union nut being composed of a first part and a second part, said parts being in engagement with each other so that by tightening said first part said second part acting as an insert piece between said first part and said clamping jaw is pulled away and pressed against said second leg of said clamping jaw.

2. The device of claim 1, wherein said first part of said union nut includes a left-hand internal thread, said second part of said union nut having a left-hand external thread meshing with said left-hand internal thread of said first part.

3. The device of claim 2, wherein said first part of said union nut further includes a right-hand internal thread, the inside diameter of said second part of said union nut being larger than the diameter of said right-hand internal thread of said first part.

4. The device according to claim 1, wherein said first leg includes two recesses and an O-ring is disposed within each recess for sealing the first leg relative to said pipe.

5. A device according to claim 1, wherein said clamping jaw includes a tail portion, said tail portion having a recess and an O-ring being disposed within said recess in said tail portion for sealing said tail portion relative to said threaded connection piece.

* * * * *